United States Patent [19]

Orcutt

[11] 3,988,943
[45] Nov. 2, 1976

[54] APPARATUS FOR AUTOMATIC CABLE CALIBRATION

[75] Inventor: John W. Orcutt, Norton, Mass.

[73] Assignee: Texas Instruments Incorporated, Dallas, Tex.

[22] Filed: Feb. 19, 1974

[21] Appl. No.: 443,591

[52] U.S. Cl. ............................................... 74/501 P
[51] Int. Cl.² ............................................. F16C 1/10
[58] Field of Search ......................... 74/501 R, 501 P

[56] References Cited
UNITED STATES PATENTS

| | | | |
|---|---|---|---|
| 3,513,719 | 5/1970 | Tschanz | 74/501 P |
| 3,572,159 | 3/1971 | Tschanz | 74/501 P |
| 3,710,645 | 1/1973 | Bennett | 74/501 P |

Primary Examiner—Samuel Scott
Assistant Examiner—Frank H. McKenzie, Jr.
Attorney, Agent, or Firm—John A. Haug; James P. McAndrews; Russell E. Baumann

[57] ABSTRACT

This invention relates to improved apparatus for the automatic calibration of cables of the type having a core wire and surrounding sheath. Such cables are commonly used in automobiles to transfer motion from a controlling member to a controlled member at a distant point which is moved in accordance with the force applied at the first member. A calibration apparatus is described which is fixedly attached to the cable sheath and comprises a rack section and a comb section which interact when force is applied to change the sheath length to that desired.

5 Claims, 5 Drawing Figures

APPARATUS FOR AUTOMATIC CABLE CALIBRATION

BACKGROUND OF THE INVENTION

A. Field of the Invention

This invention relates in general to automatic calibration devices for push-pull and related cables.

B. Description of the Prior Art

Various types of cables have been used in automotive applications for many years to transfer motion from one controlling member to another member to be controlled at a remote location, such as from the accelerator to the carburetor, from the gear shift to the transmission, from levers and knobs on the dash panel to the hood, trunk and other latches, etc. These cables generally have an interior core wire and a surrounding sheath, and are known as push-pull cables. The core wire is attached to the controlling member at one end and to the controlled device at the other to do the actual work. The sheath is also secured at both ends and acts as a guide for the core wire.

Many of the applications in which these cables are used are merely release or tighten operations that do not require close tolerances or adjustment of the cables. Some applications, however, do require a close tolerance; such as from the accelerator to the carburetor, from the gear shift to the transmission and in the heater-air conditioning blend door operation. Such close tolerance applications require that the cables be calibrated to exactly align the input and output. Several manual and automatic calibration systems have been used for this purpose, but are not entirely adequate for various reasons.

The simplest means of manual calibration is to slot the sheath at one end so that the sheath can be moved back and forth to take up or release the cable length as required. In such calibration the adjustment is done after the core wire and the non-slotted sheath end are attached. Another type of manual calibration system is to use a turnbuckle adjuster, located in the middle of the sheath, so that the sheath length may be altered to make the necessary calibration.

One type of automatic system uses outer loops of Bowden cables and a special clip that allows the loops of the cable sheath to slip by the clip and align under a one-time calibration load. Another automatic system uses a slip device in place of the turnbuckle adjuster of the manual system described above. A third automatic system is used in aligning the cable between the heater control temperature lever on an automotive dash and the water control valve. In this system, the bell crank arm of the water valve is attached to the cable core wire by means of a special slip clip. The cable is attached to the heater control temperature lever in the normal manner. The connections are made such that when the heater control temperature lever is moved the water valve bell crank arm will hit its associated stop before the heater control temperature lever hits its stop. Calibration is then achieved by forcing the heater control temperature lever to its stop while the water valve bell crank arm is resting against its stop, causing the cable core wire to move in the special slip clip, and thereby setting the correct length of cable between the two points for further normal operation.

Each of the above systems is unsatisfactory for various reasons, such as high cost, inaccurate calibration, difficulty of installation, complexity, etc.

SUMMARY OF THE INVENTION

This invention is an improved apparatus for automatically calibrating push-pull cables. The apparatus uses a slip mechanism in the sheath of the cable composed of a rack section and a comb section which interact when a force above the operational load is applied so that the two sections move in relation to each other to adjust the sheath automatically to the required length.

It is an object of this invention to provide an inexpensive apparatus for automatically adjusting push-pull cables.

It is a further object of this invention to provide a simple, yet accurate, apparatus for automatically calibrating push-pull cables.

It is a still further object of this invention to provide a strong push-pull cable calibration apparatus which is easily calibrated, yet which will maintain its calibrated setting indefinitely under normal use.

DESCRIPTION OF PREFERRED EMBODIMENTS

Figure 5:
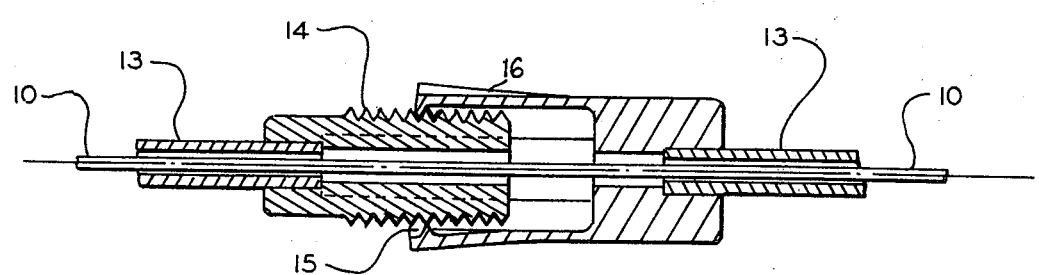
FIG. 5 is a side cross-sectional view of the automatic cable calibration apparatus of the present invention.

FIG. 5 shows the automatic cable calibration apparatus for calibrating push-pull cables within an automobile where desired. For example, such apparatus is useful in connection with my automatic temperature control system which is the subject matter of my co-pending patent application Ser. No. 422,954, filed Dec. 7, 1973. Although the instant calibration system is useful in such a system it is not limited thereto and may be used anywhere that push-pull cables are used.

Referring to FIGS. 1–4, it can be seen that the automatic cable calibration apparatus of this invention is composed of two sections: a rack section designated generally as 11 and a comb section designated generally as 12. As shown in FIG. 5, in actual use the two sections interact with each other and the core wire 10 passes therethrough. Both the rack section 11 and comb section 12 are made of plastic overmolded to the sheath 13.

The rack section 11 has a series of teeth 14 on the top and bottom thereof which run generally perpendicular to the center line of the cable. In the embodiment shown in FIGS. 1 and 3, the distance from the peak of tooth 14 to the peak of the next tooth is 0.03 inches and the distance from the top of each tooth to the bottom thereof is 0.015 inches.

Figure 1:
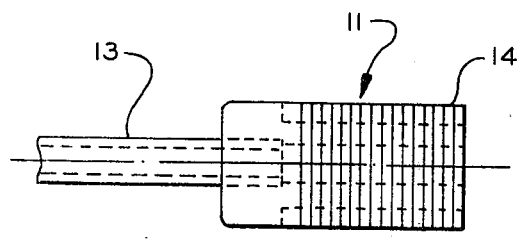
FIG. 1 is a top plan view of the rack section of the automatic cable calibration apparatus of the present invention.
Figure 2:
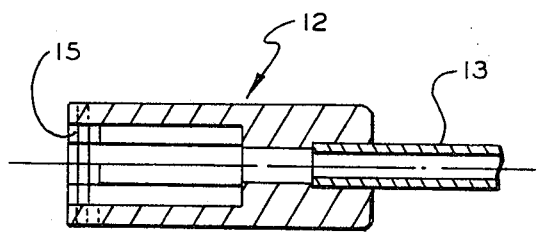
FIG. 2 is a top cross-sectional view of the comb section of the automatic cable calibrating apparatus of the present invention.
Figure 3:
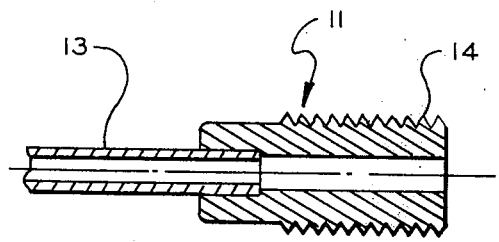
FIG. 3 is a side cross-sectional view of the rack section of the automatic cable calibration apparatus of the present invention.
Figure 4:
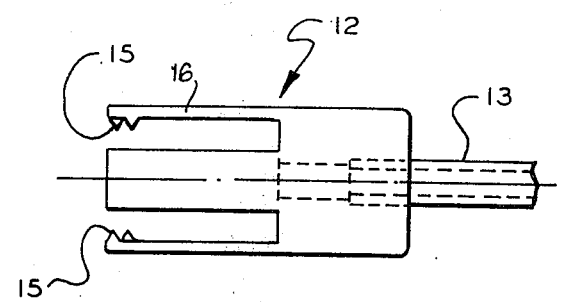
FIG. 4 is a side plan view of the comb section of the automatic cable calibration apparatus of the present invention.

The comb section 12 contains eight teeth 15, two on each leg 16 as best seen in FIG. 4, for interaction with the teeth 14 on rack member 11. The teeth 15 are offset on the comb section 12 as indicated so that at any one time one half of the peaks of the teeth 15 rest upon the peaks of the teeth 14 and one half of the peaks of teeth 15 rest in the ridge or valley section of the teeth 14 on rack section 11. This offset is shown in FIG. 4. The offset allows the comb section 12 to advance in 0.015 inch increments during calibration.

In use, the core wire 10 is initially attached at the controlling and controlled member and the sheath 13 is likewise so attached. In this position the rack section 11 and comb section 12 are connected as shown in FIG. 5. A force is then applied at the controlling member until the controlled member reaches its ultimate position. As the force at the controlling member is continued, which will be above the design force for the cable for normal use, rack member 11, biased in engagement with comb section 12 will slide by 0.015 inch increments until the controlling member reaches its ultimate position. At this point the calibration is complete. In the automatic temperature control system described in my copending application above designated, the force required to calibrate the cable is about 11 pounds whereas thereafter in operation the force transmitted to the core wire 10 is on the order of 2 to 3 pounds.

The apparatus herein described allows the calibration force to be easily controlled. In the prior art automatic cable calibration system last above described, the slip clip calibration force and the clip's position is controlled by a biting action against the solid cable core wire. This method of developing force is not satisfactory as both calibration members must be made of spring or hardened steel and the bite of one against the other is almost impossible to control. Results in calibration are forces that are either too high, over loading the installation, or too low, allowing the calibration point to shift under normal operation. It should be noted that although the invention has been described specifically in relation to a push pull cable it can also be used with cables which do not have solid cores, such as a tension cable having stranded wire cores.

Obviously many modifications and variations in the present invention are possible in light of the above teachings. The description as given is furnished as being exemplary of my invention and is not intended to in any way limit the scope of the appended claims, which are to be construed as broad as the prior art will allow. Furthermore, the apparatus disclosed herein is intended to be merely exemplary of the general classes of devices which may be employed to practice the invention. The apparatus may be modified by one skilled in the art without departing from the spirit and scope of the invention.

The abstract of my disclosure herein provided is furnished merely as a search tool and is not intended to in any way limit the scope of this invention.

What is claimed is:
1. A cable calibration device for a cable comprised of a core wire and surrounding sheath, comprising:
    a. a rack section with teeth thereon fixedly mounted on said sheath; and
    b. a comb section with teeth thereon also mounted on said sheath, said teeth on the comb section being biased in engagement with the teeth on the rack section to secure said rack section to said comb section, the teeth so shaped that a force above the design load of the cable would cause the teeth on the rack and comb sections to move over each other in either of two opposite directions thereby shortening or lengthening the sheath to calibrate the cable.
2. The device of claim 1 wherein the rack section is a male section and the comb section is a female section.
3. The device of claim 1 wherein the teeth of the comb section are mounted in pairs offset one to the other by one half of the distance between the peaks of the teeth on the rack section.
4. The device of claim 3 wherein the comb section has a plurality of legs, each leg having a free end portion, said teeth of the comb section are mounted at each respective end portion.
5. The device of claim 4 wherein the plurality of legs is 4.

* * * * *